United States Patent Office.

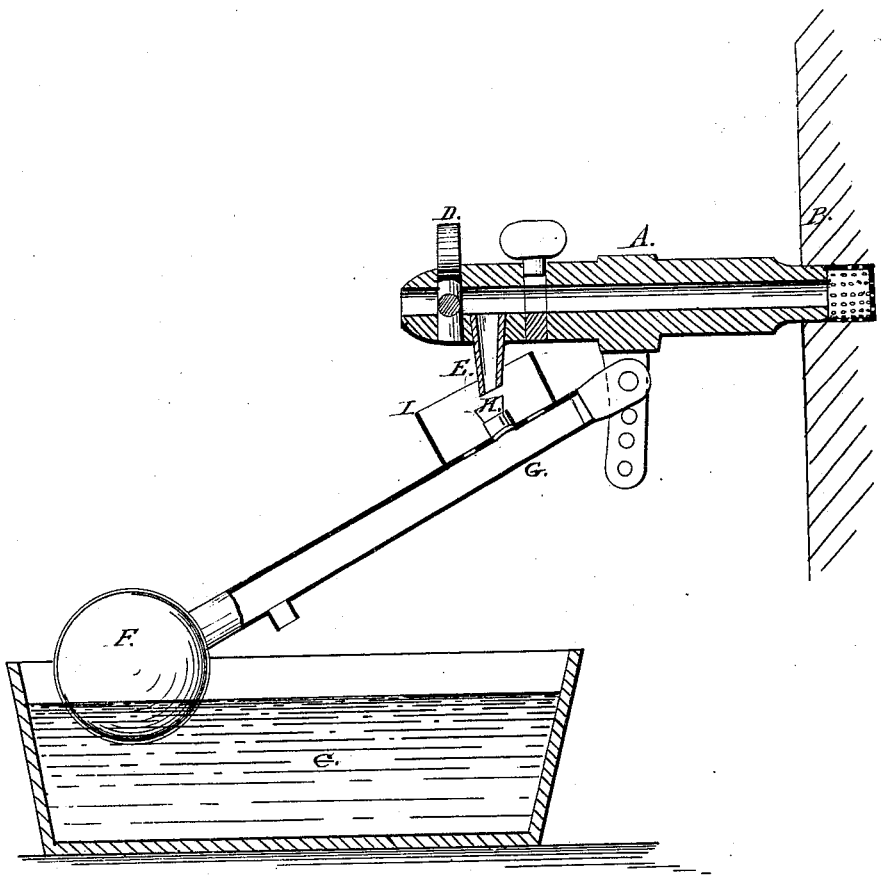

GEORGE D. CHANDLER, OF WEST CONCORD, VERMONT.

Letters Patent No. 96,392, dated November 2, 1869.

IMPROVEMENT IN SAP-FEEDER.

The Schedule referred to in these Letters Patent and making part of the same.

*To all whom it may concern:*

Be it known that I, GEORGE D. CHANDLER, of West Concord, in the county of Essex, and State of Vermont, have invented a new and improved Sap-Feeder; and I do hereby declare that the following is a full, clear, and exact description thereof, which will enable others skilled in the art to make and use the same, reference being had to the accompanying drawings, forming part of this specification.

The object of this invention is to provide a self-acting feeding-device for supplying sap-boiling kettles or pans from reservoirs, so as to keep the supply in the kettles at a uniform height, or nearly so.

The invention consists in a float having a stem hinged to the faucet, and so arranged that when the surface of the sap in the kettles whereon the float rides, falls, it will open a passage from the faucet, allowing the sap to flow until it rises sufficiently to press the said stem, which is provided with cork or other suitable packing, against the mouth of the orifice with sufficient force to close the passage, all as hereinafter more fully specified.

The drawing represents a sectional elevation of my improved device.

A represents a faucet, which may be supposed to be tapped into the wall B of a supply-tank, and arranged to discharge into a kettle or pan, C.

For filling the pan quickly, I prefer to provide the faucet with a straight hole, discharging at the end, and provided with a stop-cock, D, for closing it; and for regulating the flow, I provide the hollow stem E, float F, and the hinged stem G, and so arrange them that when the sap is high in the kettle, a cork or other yielding stopper, H, properly fixed to the lever, will be pressed up against the lower end of the hollow stem E, and close the passage until the sap falls low enough to open the passage.

I prefer to make the float-stem G hollow, and to provide a cup, I, around the place where the sap issues from the stem E, to cause it to pass into the said tube through proper openings, and through it to the kettle.

In this way, the flow of sap to the kettle or pan may be reliably and self-actingly regulated.

I propose to make the connection of the float-stem G with the faucet A adjustable, as shown at K, so that the float may be accommodated to kettles of varying height, or to vary the height of the contents of the said kettles.

Having thus described my invention,

I claim as new, and desire to secure by Letters Patent—

1. The comb of the faucet A, hollow stem E, float F, hinged stem G, and stopper H, when arranged to regulate the flow of sap self-actingly, substantially as specified.

2. The hollow hinged stem G, cup I, hollow stem E, and faucet A, all arranged as specified.

GEORGE D. CHANDLER.

Witnesses:
   S. S. GOULD,
   D. E. MAY.